United States Patent [19]

Ainoura

[11] 4,350,059
[45] Sep. 21, 1982

[54] METHOD OF PRODUCING SHAVING CUTTER

[76] Inventor: Masato Ainoura, 1253 Eguchi, Kita-Shigeyasu-cho, Miyaki-gun, Saga-ken, Japan

[21] Appl. No.: 164,736

[22] Filed: Jun. 30, 1980

Related U.S. Application Data

[62] Division of Ser. No. 39,237, May 15, 1979, Pat. No. 4,280,773.

[30] Foreign Application Priority Data

May 31, 1978 [JP] Japan ................................. 53-65360
Mar. 20, 1979 [JP] Japan ................................. 54-32469

[51] Int. Cl.³ ............................................ B21K 21/00
[52] U.S. Cl. .................................... 76/101 A; 409/293
[58] Field of Search ........................ 76/101 A, 101 R; 407/24, 27; 409/293, 348

[56] References Cited

U.S. PATENT DOCUMENTS

| | | | |
|---|---|---|---|
| 1,049,161 | 12/1912 | Smith | 407/27 |
| 1,347,848 | 3/1920 | Rayam | 407/24 |
| 1,357,815 | 11/1920 | Olson | 76/101 A |
| 2,164,642 | 7/1939 | Drader | 407/27 |
| 2,348,844 | 5/1944 | Pelphrey | 407/27 |
| 2,410,544 | 11/1946 | Mackmann | 407/27 |

Primary Examiner—Roscoe V. Parker
Attorney, Agent, or Firm—Jordan and Hamburg

[57] ABSTRACT

A screw type shaving cutter and a method of producing the same. A large number of cutting edges are formed on the flanks of the thread of the cutter. Each cutting edge is inclined along a curve or a straight line in the trailing direction as viewed in the direction of rotation of the cutter in use. This shaving cutter is produced by forming a screw body by cutting a metal blank into a form of a screw, and forming a number of cutting edges on the flanks of the thread of the screw body by reciprocatingly moving a cutting tool on the flanks of the thread, while rotating the screw body continuously in one direction.

9 Claims, 27 Drawing Figures

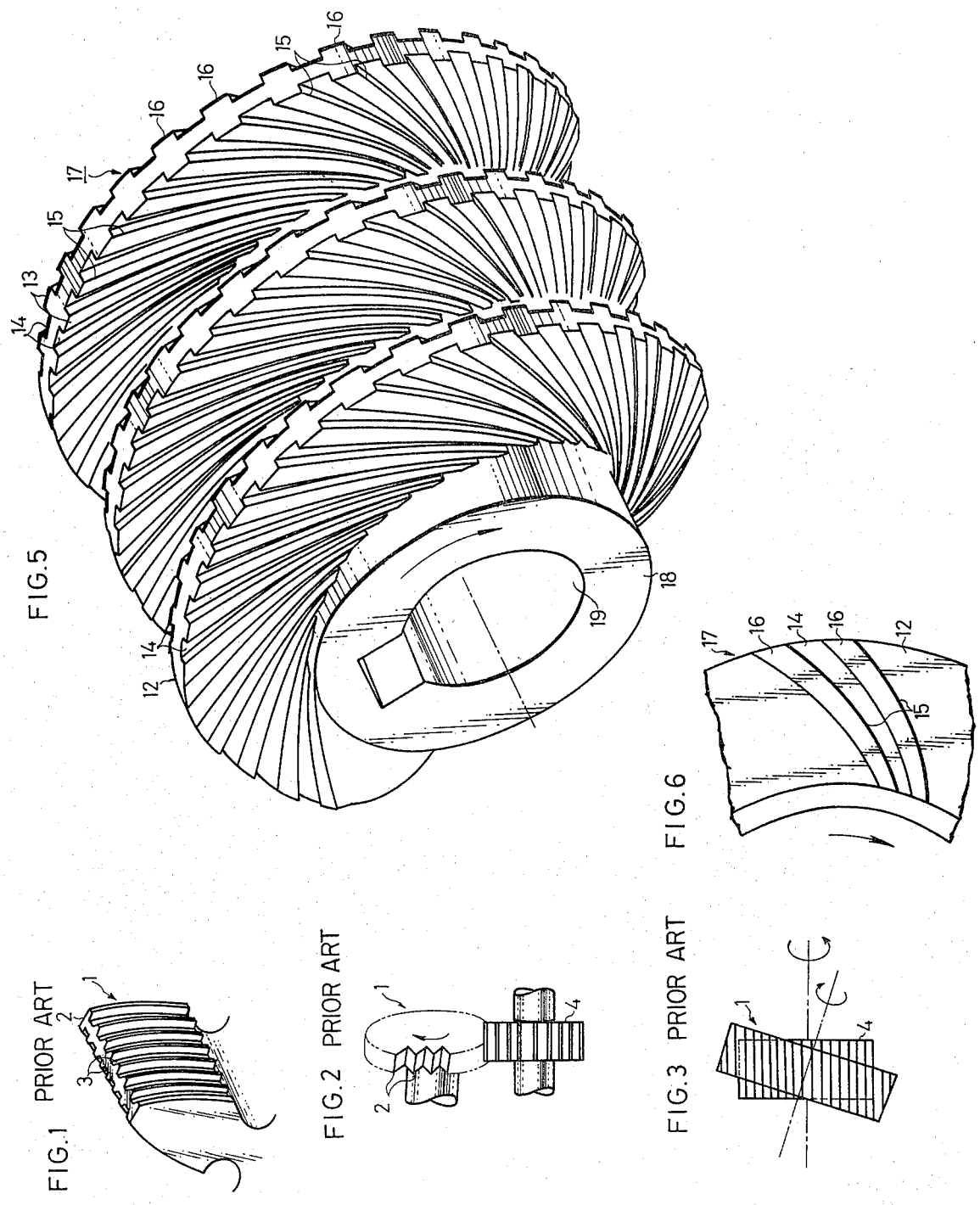

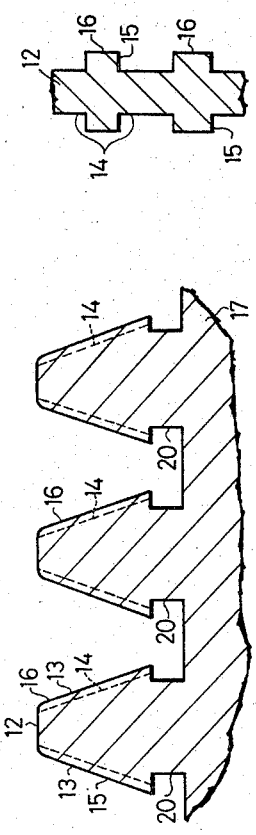
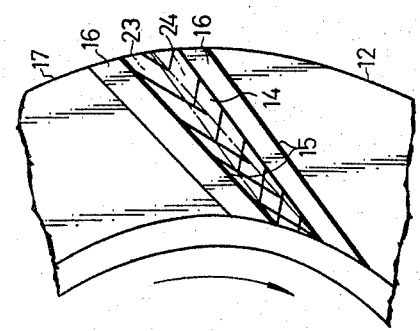
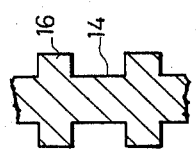
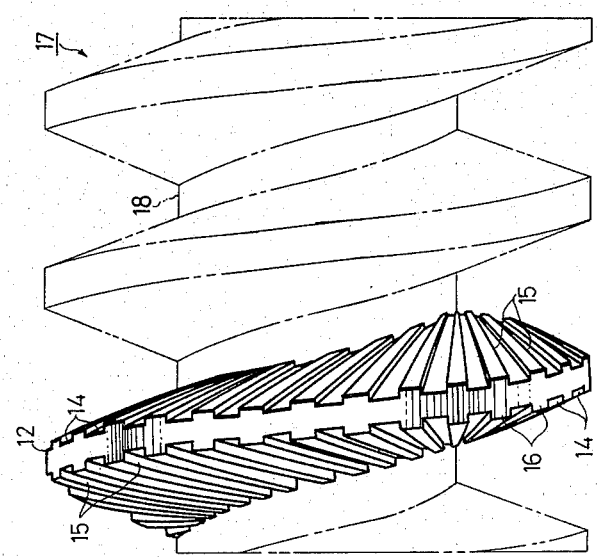
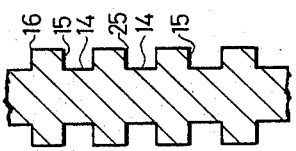
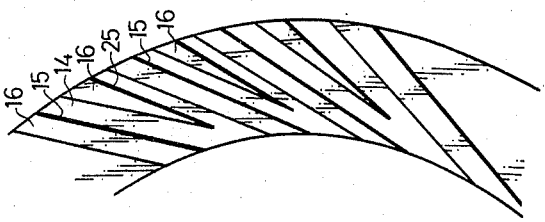

METHOD OF PRODUCING SHAVING CUTTER

This is a division of application Ser. No. 39,237 filed May 15, 1979, issued as U.S. Pat. No. 4,280,773 on July 28, 1981.

BACKGROUND OF THE INVENTION

1. Field of the Invention

The present invention relates to a shaving cutter for use in finish cutting of gears.

2. Description of the Prior Art

It is a common measure to use a shaving cutter in finishing the surface of a gear which has been produced by a gear cutting by generation process or the like method, in order to trim the profile of the gear teeth and to improve the fineness of the gear surface.

FIGS. 1 to 3 show a conventional shaving cutter which is used most popularly. As will be seen from these Figures, this shaving cutter has a form of a spur gear each teeth 2 of which is provided with cutting grooves 3 formed in its surfaces.

This shaving gear has been produced conventionally by a process having the following steps of cutting a metal blank by a gear cutting by generation process or the like method into a shape of a spiral or a spur gear, and cutting a plurality of cutting grooves 3 in the surface of each teeth along the involute curve of the teeth surface. It is extremely difficult to form a large number of cutting grooves 3 intermittently on the surfaces of a large number of teeth 2. The difficulty is enhanced because the cutting grooves 3 have to be formed along the involute curve of each teeth 2. This process, therefore, requires a considerably long time, which constitutes one of the major reasons of the raised price of the shaving cutter. When the shaving cutter has become dull, the involute surfaces of the teeth have to be ground highly precisely, employing a specific involute surface grinder having a high precision. At the present stage, the shaving cutter is applicable only to gears having modules of 16 or lower, and the gears having larger modules cannot be finished with the gear type shaving cutter.

In the use of this type of shaving cutter, the shaving cutter is meshed with the gear blank 4 at a certain inclination. As the shaving cutter is rotated, a slip is caused between the cutter 1 and the surface of teeth of the gear blank 4 to provide a grinding effect on the surfaces of gear teeth of the gear blank 4. With this shaving cutter, only a low cutting efficiency is obtained, because there is a practical limit in the amount of slip between the surfaces of teeth.

In this connection, screw type shaving cutters which have been used also conventionally can provide higher cutting efficiency because this type of shaving cutter can cause a larger slip than that caused by the gear type shaving cutter. In addition, the screw type shaving cutter can be applied to gears having larger modules to effect the finishing by shaving. For this reason, in some cases, a shaving hob 5 constituted by a worm shaft provided with radial cutting grooves 14 has been used for precisely finishing the worm gear. This shaving hob is produced by intermittently rotating a screw-like blank and grooving the blank in the radial direction to form cutting grooves while the blank is kept stationary. After the cutting of one groove, the blank is rotated and indexed for the cutting of next groove. Then, after a further indexing, a further cutting groove is formed. The work is thus made intermittently taking a long time at an extremely low efficiency of the work, resulting in a raised price of the shaving hob.

Although it has been known that the precision of the gear and the finess of the gear surface are improved by a finishing with the shaving hob 5, the use of the shaving hob has not been spread because of the difficulty in the production.

More specifically, in a shaving hob 5 having radial cutting edges 15, each cutting edge 15 cuts an area shown by a one-dot-and-dash line. As the hob 15 is rotated, the cutting edge 15 occupies the positions ①, ②, ③, ④ relatively to the teeth surface. The cutting of the gear teeth surface by the cutting edge 15 is liable to incur a vibration in the rotational direction of the gear and in the axial direction of the hob 15. The movement in the period between the operation of a cutting edge and the operation of a next cutting edge is rendered not uniform. Thus, with this type of shaving hob cannot provide a sufficient improvement of the fineness of the tooth surface and improvement of the precision of the tooth profile.

OBJECTS OF THE INVENTION

It is an object of the invention to provide a shaving cutter which can operate to chip or cut off the teeth surface of a gear to sharpen the latter, while diminishing the fluctuation of cutting force in the rotational and axial directions to suppress the vibration thereby to reduce the resistance during the finishing by shaving.

It is another object of the invention to provide a shaving cutter in which more than two cutting edges operate at a time to exclude the fluctuation of rotation speed to provide a smooth finished teeth surface of the gear to ensure a higher precision of the shape of the gear teeth, pitch, and gear cutting.

It is still another object of the invention to provide a shaving cutter in which the grinding of cutting edges can be made without using any specific machine tool, but simply with ordinary general purpose machine tool.

It is a further object of the invention to provide a shaving cutter capable of easily cutting and finishing gears having large modules which cannot be finished with gear type shaving cutter.

It is a still further object of the invention to provide a shaving cutter capable of easily and precisely grind the thread with a precision thread grinder.

It is a still further object of the invention to provide a method which can produce a screw type shaving cutter efficiently and in a shorter period of time.

Other objects of the invention will become clear from the following description of preferred embodiments of the invention and will be clarified by the appended claims. Other advantages than mentioned in this specification will be fully realized by those skilled in the art who carry out the invention.

BRIEF DESCRIPTION OF THE DRAWINGS

FIG. 1 is a perspective view of a teeth of a gear type shaving cutter;

FIGS. 2 and 3 are a front elevational view and a plan view, respectively, of a shaving cutter as shown in FIG. 1 in the state of use;

FIG. 5 is a perspective view of a screw type shaving cutter having logarithmic spiral cutting edges;

FIGS. 6 and 7 are a side elevational view and a sectional view of a part of the shaving cutter as shown in FIG. 5;

FIG. 8 is a cross-sectional view of a part of the shaving cutter as shown in FIG. 5, showing the profile of the thread;

FIG. 9 is a front elevational view of a screw type shaving cutter having a straight cutting edge;

FIGS. 10 and 11 are a side elevational view and a sectional view of a part of the shaving cutter as shown in FIG. 9;

FIGS. 12 and 13 are a side elevational view and a sectional view of a part of a shaving cutter having auxiliary cutting edges;

DESCRIPTION OF THE PREFERRED EMBODIMENTS

Figure 4:
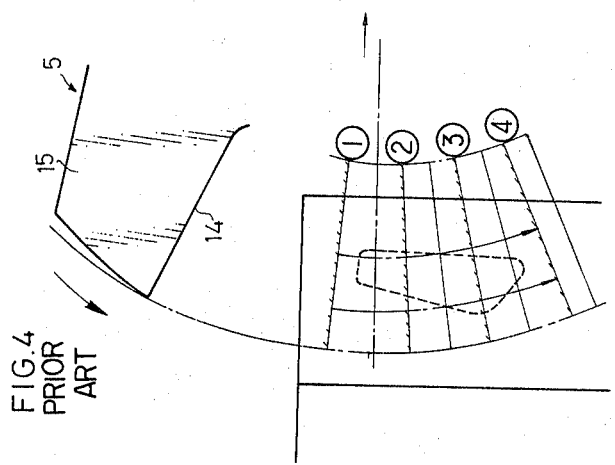
FIG. 4 is an illustration of a state in which a cutting edge of a conventional shaving hob cuts a gear teeth surface.

Hereinafter, a first embodiment of the invention will be described with specific reference to FIGS. 5 to 8.

A shaving cutter 17 of this embodiment has a base shaft 18 provided with axial central through bore 19. A thread 12 is formed on the outer peripheral surface of the base shaft 18 to provide a generally worm-like form.

On both side flanks 13 of the thread 12, formed are a large number of cutting grooves 14 at constant pitch. Each cutting groove 14 is shaped at an inclination to a line vertical to the axis of the base shaft 18 toward the trailing side as viewed in the direction of rotation, and extends along a logarithmic curve such that the amounts of inclination the above-mentioned line becomes greater as it radiates from the center of the base shaft, i.e. as it gets closer to the periphery. Therefore, a large number of cutting edges 15 are formed between respective pairs of adjacent grooves 14 at a constant circumferential pitch. Each cutting edge 15 is inclined to the radial line such that the cutting is delayed at the peripheral portion of the cutter. Each cutting edge 15 is formed along a curve with a tangential line making an angle of about 60° to the radial line.

The land 16 defining the cutting groove 14 and the cutting edge 15 has a width which varies such that it is greatest at the peripheral edge of the shaving cutter. As shown in FIG. 8, relaxation grooves 20 are formed at base portions of both flanks of the thread 12, and both edges of the cutting edge 15 are slightly rounded.

A second embodiment of the invention will be hereinafter described with specific reference to FIGS. 9 to 11. In this embodiment, the cutting grooves 14 are formed such that the cutting edges extend along straight lines which make an angle of about 60° to the radial lines. The width of the groove 14 is so varied that it is greatest at the outer extremity, so that the land 16 may have a uniform width.

FIGS. 12 and 13 show a third embodiment of the invention. In the second embodiment, the cutting groove has a varying width which is greatest at the outer extremity, so that the distance between adjacent cutting edges is made large at the outer extremities of these cutting edges 15. In this third embodiment, a short auxiliary cutting edge 25 is formed between adjacent cutting edges to compensate for this enlarged clearance between adjacent cutting edges at the outer extremity. The cutting edges 15 and the auxiliary cutting edges 25 are formed along lines which are inclined by about 50° to the radial line and to the direction of rotation toward the trailing side as viewed in the direction of rotation.

Figure 14:
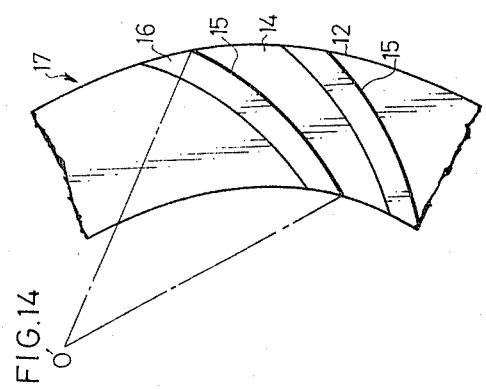
FIG. 14 is a sectional view of a part of a screw type shaving cutter having an arcuate cutting edge.

FIG. 14 shows a fourth embodiment of the invention in which each cutting edge 15 has an arcuate form centered at a point 0'.

Figure 15:
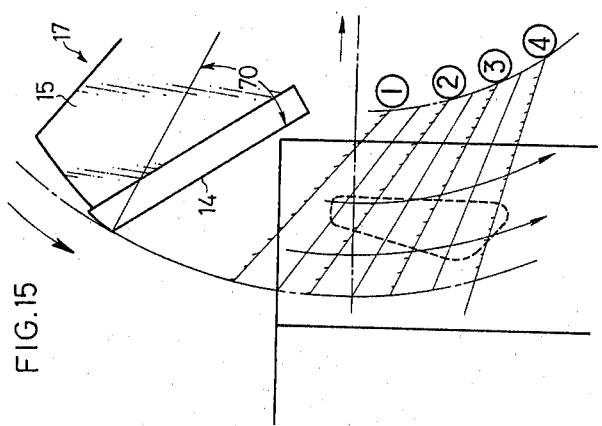
FIG. 15 is an illustration of a cutting edge of the screw type shaving cutter of the invention in the state for cutting a gear teeth surface.

The shaving cutter 17 of the invention operates, as shown in FIG. 15, such that the cutting edge 15 chips or cut off the teeth surfaces, so that the fluctuation of the cutting force in the direction of rotation of the gear and in the axial direction of the cutter shaft is small to eliminate the vibration and to reduce the vibration. In addition, the rotation of the cutter is smoothened because operation of more than two cutting edges at a time is facilitated. Consequently, the shaving cutter of the invention offers a remarkable advantage of improvement of fineness of the finished tooth surface and precision of the tooth profile. The shaving cutter will become further sharp to enhance the finishing effect, if the cutting edges are not only inclined rearwardly but also formed at such curvatures that the angle of inclination is greater at the radial outer extremity of the cutter. The thread of the shaving cutter can be precisely formed by a precision thread grinder, and the precision of the tooth profile finished by this shaving cutter is improved accordingly.

For finishing the tooth surface of a gear with the shaving cutter of the invention, the shaving cutter can conveniently be attached to a conventional gear processing machine having an attaching shaft perpendicular to the axis of the gear blank, such as hobbing machine and honing machine. It is therefore not necessary to use specific machine tool, and the conventional machine tool can be directly used in combination with the shaving cutter of the invention. If the portions of the shaving cutter meshing with the gear blank has become dull or blunt, the shaving cutter is simply moved in its axial direction so that it may mesh the gear blank at the other portion thereof. Therefore, the life of the shaving cutter of the invention can be prolonged by increasing the axial length.

When the shaving cutter of the invention has been worn out and become dull, it can be regenerated by grinding the lands 16. This can be achieved in the same manner as the grinding of a worm, making use of a precision screw grinder. In case of a conventional gear type shaving cutter, it has been necessary to cut the teeth surfaces along the involute curves, employing a specific machine tool. Such a specific machine tool is not required by the shaving cutter of the invention.

Hereinafter, a brief description will be made as to the process of manufacturing the screw type shaving cutter.

Figure 16:
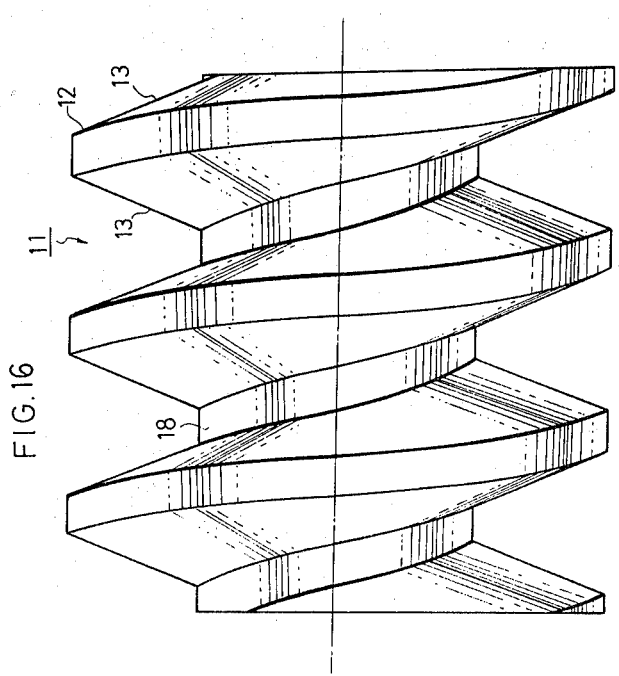
FIG. 16 is a front elevational view of a screw-like main body.

A screw body 11 as shown in FIG. 16 is formed from a metal rod by means of an ordinary thread cutting lathe. Then, while rotating continuously the screw body 11, both side flanks 13 of the thread 12 of the screw body 11 are formed from the radially outer side to the inner side, employing a cutting-off tool so as to continuously form the groove. Therefore, shaving cutters 17 having various shapes of cutting grooves 14, cutting edges 15 and lands 16 as in the first to fourth embodiments and as shown in FIGS. 22 to 25 are produced by suitably changing the speed of rotation of the screw body 11 and the feed rate of the cutting-off tool.

Hereinafter, a construction of a machine for producing a shaving cutter of the invention will be described with reference to FIGS. 17 to 21.

A spindle 31 is mounted above a machine bed 32 and is adapted to be continuously rotated by means of a motor 33. The aforementioned screw body 11 is adapted to be fixed to this spindle 31. A carriage 34 is adapted to be moved in the axial direction of the spindle 31, along a guide surface on the machine bed 32. A turret 35 is carried by the carriage 34 for a free rotation in a horizontal plane. The turret can be fixed at any desired position of rotation. A lead screw 36 is adapted to engage with a nut 37 disposed at one side of the carriage 34 so as to cause a lateral movement of the carriage 34 in a fixed relation to the rotation of the spindle 31.

Therefore, as the spindle 31 is rotated by the motor 33, the lead screw 36 is rotated by the spindle 31 through a feed changing gear mechanism 38 so as to feed the carriage 34 to the left or right through the nut 37 meshing therewith and mounted on the carriage.

The movement of the carriage 34 is synchronized with the lateral shift of the thread 12 of the screw body rotated by the spindle 31. The speed of the movement of the carriage 34 and also the speed of lateral shift of the thread 12 can be adjusted by changing the gears of the feed changing gear mechanism 38.

Reference numeral 39 denotes a sliding way provided on the upper surface of the turret 35. An operation cam 40 is disposed below the sliding way 39 and is adapted to be driven by the motor 33 through a groove indexing gear mechanism 41 and bevel gears 42, 43. A cam follower 44 formed on the lower surface of the sliding way 39 is kept in contact with the outer cam contour of the operation cam 40 by the resilient force exerted by a spring 56. The arrangement is such that the sliding way 39 makes one cycle of reciprocating movement as the operation cam 40 makes one full rotation. The rotation speed of the cam 40 can be freely adjusted in relation to the rotation of the spindle 31, by changing the gears of the groove indexing gear mechanism 41.

Figure 20:
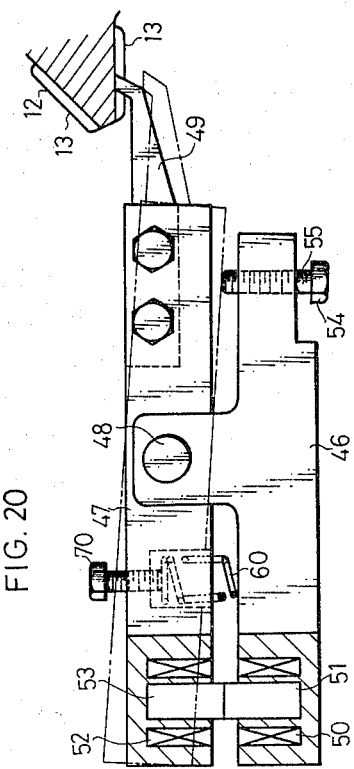
FIG. 20 is an enlarged sectional plan view of a part of the machine tool as shown in FIG. 17.
Figure 17:
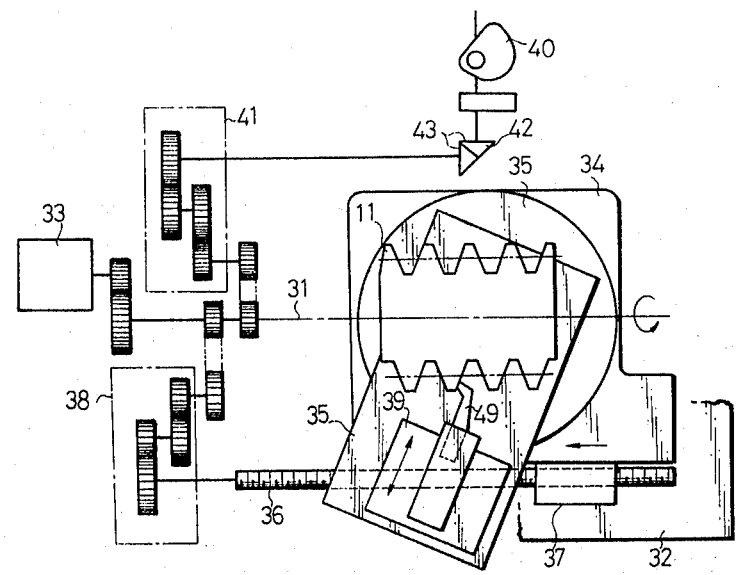
FIGS. 17, 18 and 19 are a plan view, an enlarged plan view and an enlarged side elevational view of machine tool for producing the shaving cutter of the invention.
Figure 18:
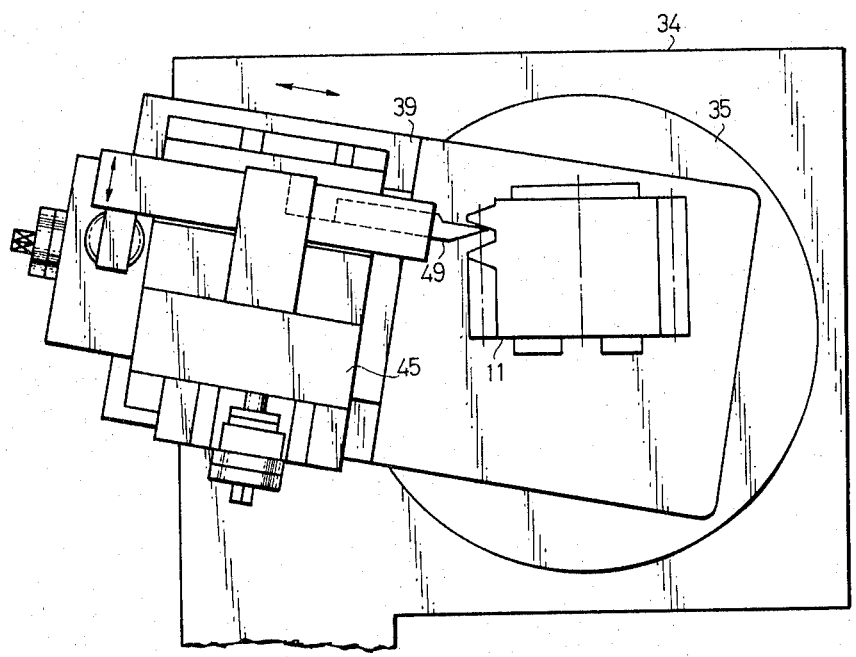
Figure 19:
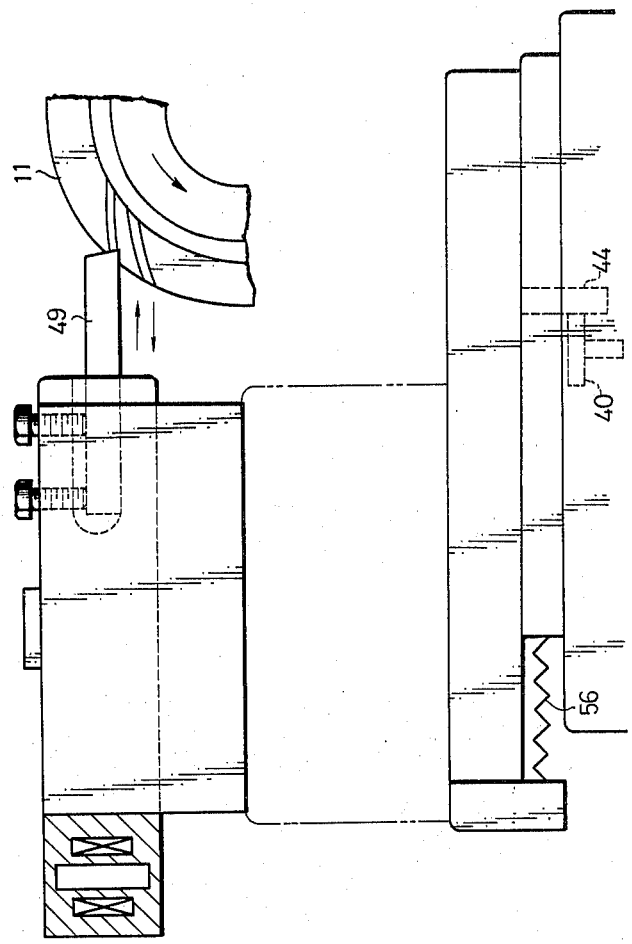

A tool rest 45 is fixed to the upper side of the sliding way 39. As shown in FIG. 20, a bracket 46 is fixed to the upper side of the tool rest 45. A tool holder 47 is supported by a shaft 48 rotatably in a horizontal plane. A cutting tool 49 is fixed to the tool holder 47. The arrangement is such that, when the tool support 47 is positioned at a predetermined position of rotation, the tool moves along the flank 13 of the thread 12 from the outer side to the inner side to cut the flank 13, as the sliding way 39 makes a forward stroke of its reciprocating movement.

A reference numeral 50 denotes a first solenoid fixed to the bracket 46, while a second solenoid designated at a numeral 52 is fixed to the tool holder 47. These solenoids are energized during forward stroke of the sliding way 39 to make a core 53 fixed to the tool holder 47 and a core 51 fixed to the bracket 46 attract and fixed to each other, so that the cutting tool 49 is held at the cutting position on the screw body 11, through the medium of the tool holder 47. In the backward stroke of the sliding way 39, the solenoids 50, 52 are de-energized to allow the cores 51 and 53 to be separated from each other by a compression spring 60 to retract the cutting tool 49 to a non-cutting position and to hold the same at that position. The force of the spring 60 can be adjusted by means of a bolt 70. A stopper 54 screwed into a threaded bore 55 formed in the tool holder 47 is adapted to limit the movement of the tool holder at the non-cutting position.

Hereinafter, the process for manufacturing the shaving cutter will be described in more detail. After forming the relaxation grooves 20 in the screw body 11 which has been beforehand threaded, the screw body 11 is attached to the spindle 31. Then, the turret 35 is rotated and adjusted such that the direction of movement of the cutting tool caused by the reciprocating motion of the sliding way 39 due to the action of the cam coincide with the flank 13 of the thread 12 of the screw body 11.

Then, as the motor 33 is started, the screw body 11 is continuously rotated and the lead screw 36 is also rotated to laterally feed the carriage 34 together with the cutting tool 49 following up the lateral shift of the thread 12.

Meanwhile, the rotation of the motor 33 causes a continuous rotation of the operation cam 40. By the action of this cam, the sliding way 39 makes a reciprocating motion to cause a reciprocating movement of the cutting tool 49 on the flank 13 of the thread 12.

The number of gears in the groove indexing gear mechanism 41 is so selected that the number of reciprocating cycles of the cutting tool coincides with the number of grooves to be formed in one rotation of the screw body 11.

Then, during the forward stroke in which the cutting tool 49 makes from the peripheral position toward the center of the screw body, the solenoids 50 and 52 are energized to hold the cutting tool 49 at the cutting position to effect the cutting. On the other hand, in the backward stroke in which the cutting tool 49 is moved radially outwardly, the solenoids 50 and 52 are de-energized to allow the spring 60 to hold the cutting tool 49 at the non-cutting position. Thus, the cutting tool 49 is held at the non-cutting position during its backward travel to the starting position.

Therefore, a plurality of generally curvilinear cutting grooves 14 are formed at a constant pitch on the flank of the thread 12. The shape of the curvilinear cutting groove can be changed by changing the cam contour of the cam. Consequently, a plurality of cutting edges 15, which usually trails toward the outer extremity, are formed at a constant circumferential pitch.

After forming the cutting grooves 14 on the entire part of one of the flank 13 of the thread 12, the turret 35 is rotated to align the direction of movement of the sliding way 39 with the other flank of the thread, and the cutting grooves are formed on the other flank in the same manner as described. By so doing, cutting edges of the same orientation are formed on both flanks of the thread. Alternatively, cutting edges of opposite orientations are formed on both flanks of the thread, by resetting the screw body 11 such that its axial ends are reversed, before the cutting of the grooves in the second flank 13.

In order to make the land 16 have a constant width, the cutting of one groove 14 may be effected in several steps. Namely, after forming the cutting groove portion 23 as hatched in FIG. 10, a subsequent cutting is effected with the position of the cutting tool 49 slightly deviated to cut a groove portion 24 which is continuous from the groove portion 23. By so doing, it is possible to obtain a land 16 having a constant width over its length.

Figure 21:
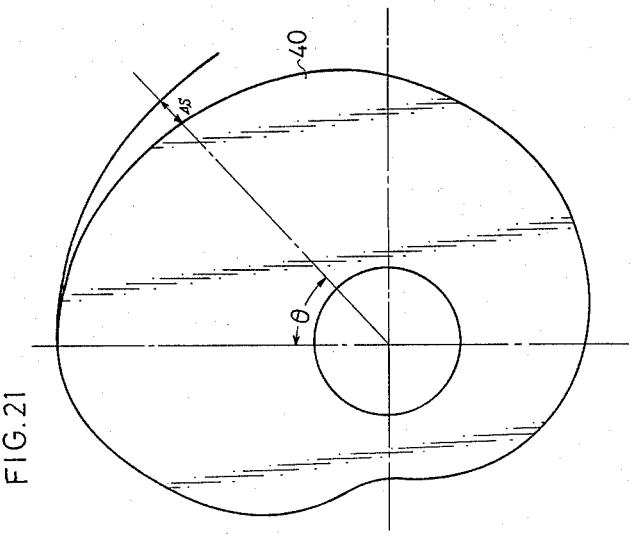
FIG. 21 is a plan view of an operation cam.

The shape of the cutting edge 15 can be changed as desired by controlling the cutting speed of the cutting tool 49. The cutting speed of the cutting tool 49, i.e. the speed of movement of the sliding way 39 is determined by the change of depression ΔS of the outer peripheral surface of the operation cam 40 as shown in FIG. 21. It is therefore possible to obtain the desired shape of the cutting edge 15 through a theoretical analysis of the cam contour of the outer peripheral surface of the operation cam 40.

The cam contour of the operation can 40 is determined through determining the depression ΔS of each point on the cutting edge 15 from the outer periphery of the shaving cutter 17.

Figure 22:
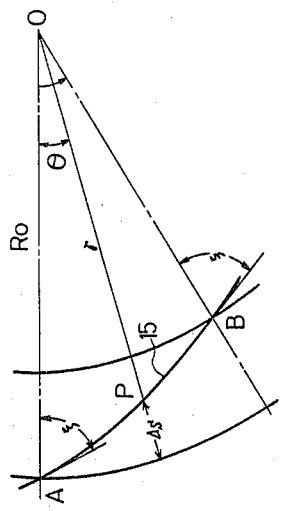
FIGS. 22, 23 and 24 are diagrams showing cutting edges of logarithmic spiral shape, arcuate shape and straight shape, respectively.

Some examples of determination of the cam contour are shown below. FIG. 22 shows a cutting edge 15 having a so-called logarithmic spiral curve in which the tangential line at each point of the curve makes a constant angle ξ to the radius of the cutter. Representing the starting point of the cutting edge 15 on the peripheral edge of the cutter 17 by A, radius of the cutter 17 by Ro, a distance of a point P on the cutting edge 15 from the center O of cutter by r, angle formed between line OP and a tangential line at point P by ξ and the angle formed between the lines OA and OP by θ, the logarithmic spiral curve is given by the following equation (1).

$$r = a \cdot \exp(-\theta \cot \xi) \quad (1)$$

where a represents a constant.

When the angle θ is zero, the above equation (1) can be transformed as follows, because in this case r equals to Ro.

$$Ro = a$$

It is therefore possible to determine the value of the constant a.

Then, the following equation (2) is established.

$$r = Ro \cdot \exp(-\theta \cot \xi) = Ro - \Delta S \quad (2)$$

This equation (2) can be converted as follows.

$$\Delta S = Ro - Ro \cdot \exp(-\theta \cot \xi) = Ro[1 - \exp(-\theta \cot \xi)] \quad (3)$$

It is therefore possible to determine the depression ΔS for forming the cutting edge 15 having logarithmic spiral curve. The values of angle ξ and the cutter radius Ro are given by the design. The cam contour of the operation cam 40 is determined in accordance with this equation (3). Namely, the cam contour is designed such that the cam surfaces depresses or falls by a height ΔS as the cam 40 rotates by a rotation angle θ, as shown in FIG. 21.

Figure 23:
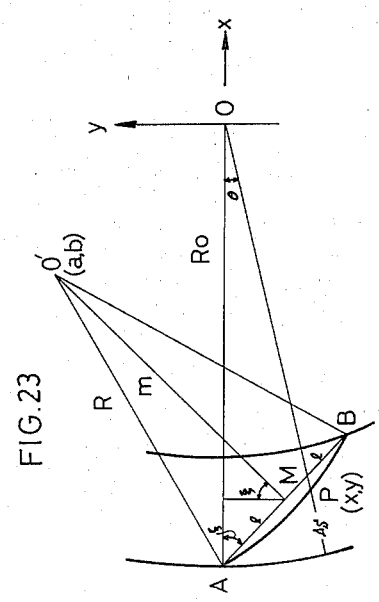

FIG. 23 shows a cutting edge 15 which has an arcuate form centered at a point O'. Assuming here a coordinate with an origin located at the center O of the cutter 17, the circle of a radius R and centered at a point O' is represented by the following equation (4), in which the x and y coordinates of the point O' is represented by a and b, respectively.

$$(x-a)^2 + (y-b)^2 = R^2 \quad (4)$$

The coordinates a and b are given by the following equations (5) and (6), representing the midpoint of the chord AB by M, the lengths of the line AM(=BM) and the line O'M by l and m, and the angle formed between the line OA and the chord AB by ξ.

$$a = -Ro + (l \cos \xi + m \sin \xi) \quad (5)$$

$$b = m \cos \xi - l \sin \xi \quad (6)$$

Substituting the equations (5) and (6) for the equation (4), the following equation (7) is derived.

$$(x - l \cos \xi - m \sin \xi + Ro)^2 + (y - m \cos \xi + l \sin \xi)^2 = R^2 \quad (7)$$

where, x and y are given by the following equations (5) and (6), respectively.

$$x = r \cos(\theta + \pi) \quad (8)$$

$$y = r \sin(\theta + \pi) \quad (9)$$

The equation (7) is transformed to a polar coordinate with an origin 0, making use of the two equations (8) and (9) as follows.

$$[r \cos(\theta + \pi) - l \cos \xi - m \sin \xi + Ro]^2 + [r \sin(\theta + \pi) - m \cos \xi + l \sin \xi]^2 = R^2$$

From this equation, the following equation (10) is derived.

$$(r \cos \theta + l \cos \xi + m \sin \xi - Ro)^2 + (r \sin \theta + m \cos \xi - l \sin \xi)^2 = R^2 \quad (10)$$

Since r equals to the difference between Ro and ΔS, the equation (10) can be converted into the following equation (11).

$$[(Ro - \Delta S) \cos \theta + l \cos \xi + m \sin \xi - Ro]^2 + [(Ro - \Delta S) \sin \theta + m \cos \xi - l \sin \xi]^2 = R^2 \quad (11)$$

It is possible to obtain the depression ΔS for producing the cutting edge 15 having an arcuate form. The values of the angle ξ, radius Ro of the cutter 17 and the length R are given by the design. It is therefore possible to determine the cam contour in accordance with this equation.

Figure 24:
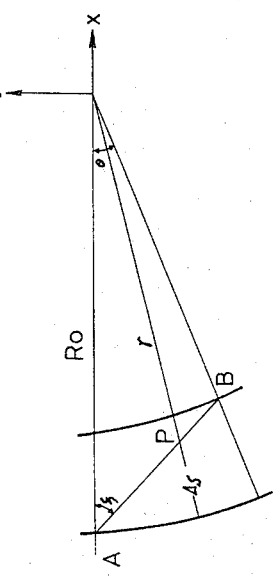

FIG. 24 illustrates the formation of a straight cutting edge 15. Representing the angle formed between the line OA and the cutting edge 15 by ξ, this line is given by the following equation (12).

$$y = -x \tan \xi + b \quad (12)$$

Since x equals to −Ro when y is zero, the following equation (13) is derived.

$$b = -Ro \tan \xi \quad (13)$$

Therefore, from equations (12) and (13), the following equation (14) is derived.

$$y = -x \tan \xi - Ro \tan \xi \quad (14)$$

This equation (14) can be converted to a polar coordinate having an origin located at the point 0 as follows.

$$r \sin (\theta + \pi) = -r \tan \xi \cos (\theta + \pi) - Ro \tan \xi$$

This equation can be transformed to the following equation (15).

$$-r \sin \theta = r \tan \xi \cos \theta - Ro \tan \xi \quad (15)$$

Since r equals to the difference between Ro and $\Delta S$, the above equation (15) is transformed as follows.

$$-(Ro - \Delta S) \sin \theta = (Ro - \Delta S) \tan \xi \cos \theta - Ro \tan \xi$$

This equation is further converted as follows.

$$\Delta S = \frac{Ro(\tan \xi \cos \theta + \sin \theta - \tan \xi)}{\tan \xi \cos \theta + \sin \theta}$$

This equation is further transformed to the following equation (16).

$$\Delta S = \frac{Ro(\sin \xi \cos \theta + \cos \xi \sin \theta - \sin \xi)}{\sin \xi \cos \theta + \cos \xi \sin \theta} \quad (16)$$

It will be seen that the depression $\Delta S$ for obtaining straight cutting edge 15 can be determined by this equation (16). Since the angle $\xi$ and the cutter radius Ro are given by design, the cam contour can be determined in accordance with the equation (16).

Figure 25:
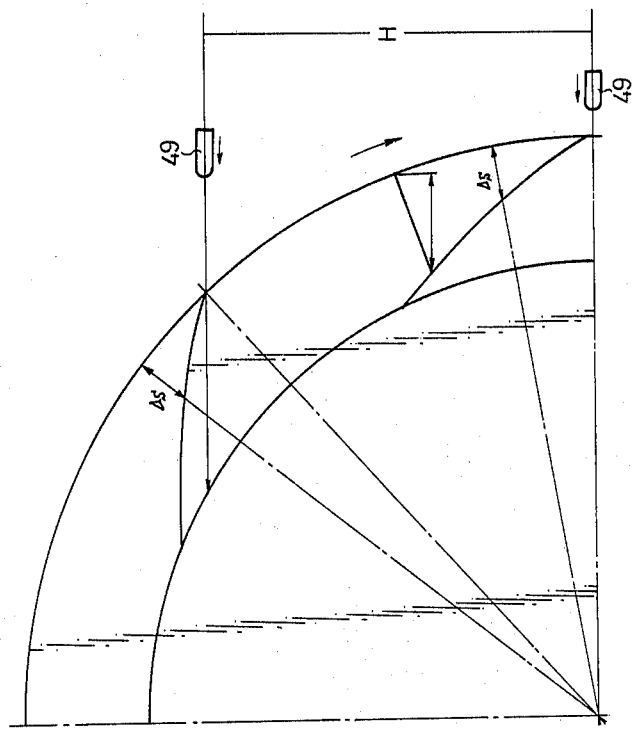
FIG. 25 is a diagram showing a relationship between the cutting of cutting edge with an offset and the cutting of cutting edge without the offset.

FIG. 25 shows a comparison between a case in which the cutting tool 49 is moved toward the center of the cutter 17 and a case in which the cutting tool is advanced in parallel with the preceding radial line after an offset by H, in the formation of the logarithmic spiral cutting edge 15.

In this case, the shape of the cutting edge 15 is not changed but the operation of the same is changed. From a view point of easiness of the cutting in, it is preferred to employ a suitable offset of the cutting tool.

As has been described, according to the invention, it is possible to form curved or straight cutting grooves in a shaving cutter, continuously and automatically, through suitably controlling the speed of reciprocating movement of the cutting tool making use of a cam having a theoretically analyzed specific cam contour and rotated in a timed relation with a spindle while rotating the spindle carrying a screw body continuously.

It is therefore possible to produce a shaving cutter in quite a shorter time and much more easily as compared with the conventional production process in which the work is rotated intermittently and processed while it is held stationary.

The production method of the invention can advantageously be applied also to the production of the shaving hob.

Figure 26:
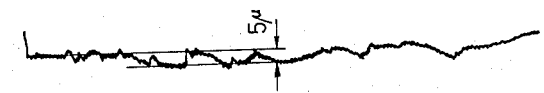
FIGS. 26 and 27 show the results of measurements of precision of tooth profile before and after a finishing by the screw type shaving cutter of the invention, in comparison with each other.
Figure 27:
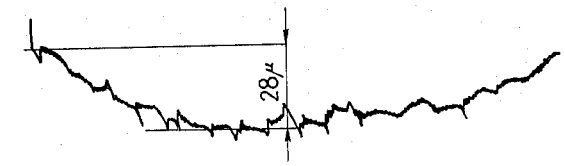

FIG. 26 shows an example of the tooth profile of a spur gear finished by a spiral type shaving cutter of the invention having logarithmic spiral cutting edges, while FIG. 27 shows the hobbed tooth profile before the finishing. The error of tooth profile of this gear is 28$\mu$ before the finishing, and is reduced to 5$\mu$ by the finishing. The shaving cutter has a module number of 8, pressure angle of 20° and an outside diameter of 150 mm. The number of threads is 1 (one) and the direction of the thread is clockwise. The number of cutting grooves is 40, while the width of the land is 0.8 mm. A steel SKH55 ($H_{RC}=65$) is used as the material. The module number, number of teeth, outside diameter and the tooth width of the finished gear are 8, 19, 168 mm and 55 mm, respectively. The material of this gear is S45C($H_B=180$).

The finishing is made under condition of a cutting speed of 60 m/mm, feed rate of 1 mm/rev and cutting of 0.03 mm.

It is clear that the improvement in the precision of tooth profile, which has been conventionally one of the most difficult works in thread cutting, can easily be achieved by the use of a screw type shaving cutter. Also, the fineness of the tooth surface can be remarkably improved.

Although the invention has been described through several preferred embodiments, it is to be noted here that these embodiments are not exclusive, and the invention can be carried out in other ways as summarized below.

(a) One of the solenoids 50, 52 for switching the cutting tool can be omitted.

(b) It is possible to substitute springs for the solenoids to effect an equivalent motion of the cutting tool mechanically.

(c) The cutting grooves 14 may be formed by a special processing method such as an electric discharge processing method.

(d) It is possible to use a screw body having more than two threads and to form the cutting edges on each of the thread.

The invention has been described to some details through its most preferred forms. It is to be noted, however, that the description is not in limiting sense but, rather, various other embodiments of the invention can be made without departing from the spirit and scope of the invention which are limited solely by the appended claims.

What I claim is:

1. A method of producing a shaving cutter comprising the steps of:
preparing a metal blank including a base shaft and a continuous helical thread on the outer periphery of said base shaft;
rotating said base shaft continuously at a constant speed;
reciprocating a cutting tool toward and away from said base shaft and laterally moving said cutting tool continuously parallel to said base shaft to form a plurality of cutting grooves on a flank of said thread, said cutting grooves extending from an inner end adjacent to said base shaft to an outer end radially outwardly away from the shaft so that the cutting grooves are inclined at angles between 15° and 90° relative to lines extending radially outwardly from said base shaft in the direction opposite to the rotational direction of the shaft for shaving, said cutting grooves respectively defining lands therebetween having cutting edges at leading edges thereof for cutting teeth surfaces of a gear to be shaved; and
controlling said lateral and reciprocal movement of said cutting tool to synchronize with rotation of said base shaft, said reciprocal movement of said cutting tool being actuated by rotation of a cam member associated with said base shaft, said cam member having a cam contour which exhibits a depression given by the following equation as the cam member is rotated at an angle $\theta$, in order to form logarithmic spiral cutting edges on said thread of the base shaft, $$\Delta S = Ro[1 - \exp(-\theta \cot \xi)]$$

wherein $\xi$ represents an angle formed between the radial line from said base shaft at a point on said cutting edge and a line tangential to said cutting edge at said point; $\theta$ represents a central angle of said base shaft between the point at which the cutting is commenced and another point; Ro represents the radius of said thread on the base shaft and $\Delta S$ represents a radial depression at a point on said cutting groove.

2. A method of producing a shaving cutter according to claim 1, in which said metal blank further includes at least one relaxation groove at bottom portions of the flanks of said thread.

3. A method of producing a shaving cutter according to claim 1, further comprising the steps of adjusting the cutting tool to cut the cutting grooves on the other flank of said thread after cutting the grooves on one flank, and repeating the steps of rotating said base shaft, reciprocating and moving the cutting tool relative to said base shaft, and controlling the movement of the cutting tool so that the cutting grooves are formed on both flanks of the thread.

4. A method of producing a shaving cutting comprising the steps of:

preparing a metal blank including a base shaft and a continuous helical thread on the outer periphery of said base shaft;

rotating said base shaft continuously at a constant speed;

reciprocating a cutting tool toward and away from said base shaft and laterally moving said cutting tool continuously parallel to said base shaft to form a plurality of cutting grooves on a flank of said thread, said cutting grooves extending from an inner end adjacent to said base shaft to an outer end radially outwardly away from the shaft so that the cutting grooves are inclined at angles between 15° and 90° relative to lines extending radially outwardly from said base shaft in the direction opposite to the rotational direction of the shaft for shaving, said cutting grooves respectively defining lands therebetween having cutting edges at leading edges thereof for cutting teeth surfaces of a gear to be shaved; and controlling said lateral and reciprocal movement of said cutting tool to synchronize with rotation of said base shaft, said reciprocal movement of said cutting tool being actuated by rotation of a cam member associated with said base shaft, said cam member having a cam contour which exhibits a depression $\Delta S$ from the maximum radius given by the following equation as the cam member is rotated by an angle $\theta$, in order to form arcuate cutting edges each of which is centered at a desired point on said metal blank, $$[(Ro - \Delta S) \cos \theta + l \cos \xi + m \sin \xi - Ro]^2 + [(Ro - \Delta S) \sin \theta + m \cos \xi - l \sin \xi]^2 = R^2$$

wherein R represents a radius of said arcuate cutting edge; Ro represents a radius of said thread; $\xi$ represents an angle formed between the chord of the arc of said cutting edge and a radial line from said base shaft; $\Delta S$ represents the depression of a desired point on said arc from its periphery; $\theta$ represents the central angle of said base shaft between said desired point and a point at which the outer periphery of said thread intersects said arc; m represents the distance between the mid point of said chord and the center of said arc; l represents the half length of said chord.

5. A method of producing a shaving cutter according to claim 4, in which said metal blank further includes at least one relaxation groove at bottom portions of the flanks of said thread.

6. A method of producing a shaving cutter according to claim 4, further comprising the steps of adjusting the cutting tool to cut the cutting grooves on the other flank of said thread after cutting the grooves on one flank, and repeating the steps of rotating said base shaft, reciprocating and moving the cutting tool relative to said base shaft, and controlling the movement of the cutting tool so that the cutting grooves are formed on both flanks of the thread.

7. A method of producing a shaving cutter comprising the steps of:

preparing a metal blank including a base shaft and a continuous helical thread on the outer periphery of said base shaft;

rotating said base shaft continuously at a constant speed;

reciprocating a cutting tool toward and away from said base shaft and laterally moving said cutting tool continuously parallel to said base shaft to form a plurality of cutting grooves on a flank of said thread, said cutting grooves extending from an inner end adjacent to said base shaft to an outer end radially outwardly away from the shaft so that the cutting grooves are inclined at angles between 15° and 90° relative to lines extending radially outwardly from said base shaft in the direction opposite to the rotational direction of shaft for shaving, said cutting grooves respectively defining lands therebetween having cutting edges at leading edges thereof for cutting teeth surfaces of a gear to be shaved; and controlling said lateral and reciprocal movement of said cutting tool to synchronize with rotation of said base shaft, said reciprocal movement of said cutting tool being actuated by rotation of a cam member associated with said base shaft, said cam member having a cam contour which exhibits a depression $\Delta S$ from the maximum radius given by the following equation as the cam member is rotated by an angle $\theta$, in order to form straight cutting edges on said thread $$\Delta S = \frac{Ro(\sin \xi \cos\theta + \cos \xi \sin\theta - \sin \xi)}{\sin \xi \cos\theta + \cos \xi \sin\theta}$$

wherein Ro represents a radius of said thread; $\xi$ represents an angle formed between the cutting edge and the radial line at the outer extremity of said cutting edge; $\theta$ represents a central angle of said base shaft between a desired point on said cutting edge and the outer extremity of said cutting edge; and ΔS represents the depression of the desired point on said cutting edge.

8. A method of producing a shaving cutter according to claim 7, in which said metal blank further includes at least one relaxation groove at bottom portions of the flanks of said thread.

9. A method of producing a shaving cutter according to claim 7, further comprising the steps of adjusting the cutting tool to cut the cutting grooves on the other flank of said thread after cutting the grooves on one flank, and repeating the steps of rotating said base shaft, reciprocating and moving the cutting tool relative to said base shaft, and controlling the movement of the cutting tool so that the cutting grooves are formed on both flanks of the thread.

* * * * *